United States Patent Office 3,399,187
Patented Aug. 27, 1968

3,399,187
COPPER-CONTAINING DISAZO DYESTUFFS
Rudolf Dürig, Basel, and Werner Bossard, Riehen, near Basel, Switzerland, assignors to J. R. Geigy A.G., Basel, Switzerland
No Drawing. Filed Aug. 23, 1965, Ser. No. 481,885
Claims priority, application Switzerland, Sept. 30, 1964, 12,722/64
6 Claims. (Cl. 260—148)

ABSTRACT OF THE DISCLOSURE

Copper-containing disazo dyestuffs of the formula

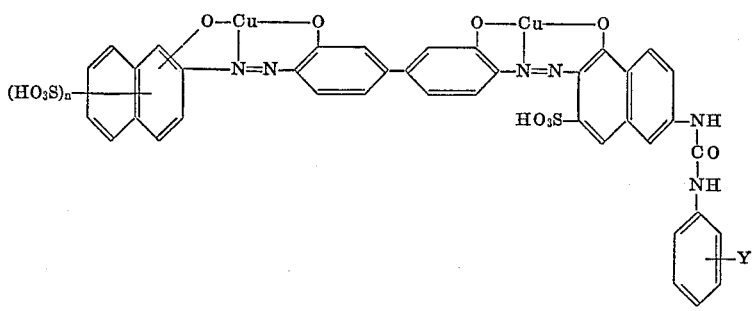

wherein
Y represents hydrogen, lower alkyl, lower alkoxy, lower alkanoylamino, benzoylamino, nitro, sulfo, chlorine or bromine, and
$n$ represents a positive whole number from 1 to 3, and which dyestuff contains from 3 to 4 sulfonic acid groups.

The dyestuffs are useful for the dyeing of fibers containing cellulose.

---

The present invention concerns new copper-containing disazo dyestuffs, a process for the production thereof, their use for the dyeing of fibers containing cellulose as well as, as industrial products, textile material dyed therewith.

It has been found that valuable copper-containing disazo dyestuffs are obtained by coupling a known tetrazotized 4,4-diaminodiphenyl compound of the formula

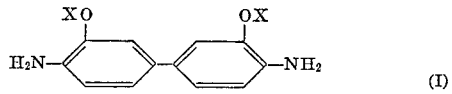

wherein X represents a lower alkyl radical, especially methyl or ethyl, in any order desired, with a known hydroxynaphthalene sulfonic acid, coupling in a position adjacent to the hydroxyl group, and being of the formula

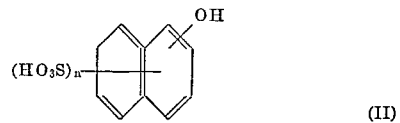

wherein $n$ is a positive integer ranging from 1 to 3, and with a compound of the formula

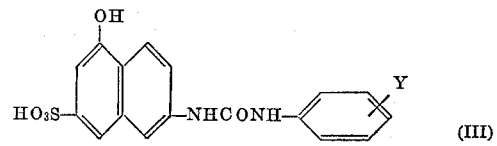

wherein Y represents hydrogen, lower alkyl, lower alkoxy, acylamino especially lower alkanoylamino or benzoylamino, nitro, sulfo or halogen, especially chlorine or bromine, to form the corresponding disazo compound, the components being so chosen that the end product contains from 3 to 4 sulfonic acid groups, and converting this disazo compound with agents giving off copper to a copper complex diazo dyestuff of the formula

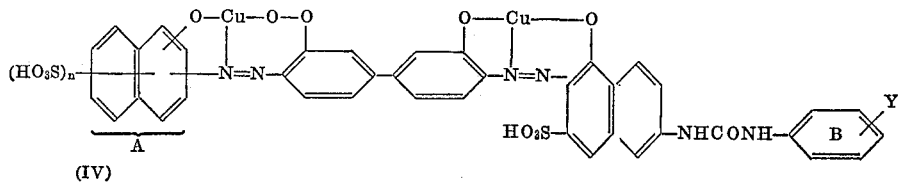

(IV)

"Lower" in connection with an aliphatic radical means that the latter contains from 1 to 4 carbon atoms.

The tetrazotized 4,4-diaminodiphenyl compound of Formula I is coupled with the compounds of Formula II and III to form the disazo compounds in a known manner in an alkaline medium, optionally in the presence of organic nitrogen bases which facilitate the coupling such as pyridine and homologs thereof, trialkylamines or tertiary alkanolamines.

In the form of their alkali metal salts, the metal-free disazo compounds are dark powders which dissolve in water with a blue color. They are preferably coppered in substance and the cellulose fibers are dyed with the dyestuffs containing copper. Agents giving off copper used to form such dyestuffs are mainly water soluble copper(II) salts, particularly copper(II)-sulfate or copper(II)-tetramine sulfate. The metallizable disazo compounds are coppered by known methods, advantageously in a weakly acid to alkaline medium, optionally in the presence of water-soluble organic bases such as dialkylamines or pyridine. However, the metal-free disazo compounds can also be dyed onto cellulose fibers from an aqueous liquor containing organic salt having a neutral reaction such as sodium sulfate and then treated, on the fiber, with agents giving off copper.

The new dyestuffs of Formula IV have very great substantivity but in spite of this fact they possess very good water solubility. Thus very deep navy blue dyeings having a light reddish or greenish tinge can be attained therewith on cellulose fibers such as cotton, preferably by exhaustion dyeing. The dyeings have remarkable fastness properties, particularly when after-treated with cationic agents which improve the wet fastness properties.

Compared with known dyestuffs in which the terminal benzene radical B is linked to the adjacent naphthalene moiety via a semi-urea bridge, the dyestuffs of the invention are distinguished by improved drawing power from exhaustion dyebaths; moreover, the resulting dyeings on cotton obtained with the said known dyestuffs are of inferior wash fastness (test: bleeding on wool in weakly alkaline medium at 60° C.) even when aftertreated with a cationic dyestuff fixing agent.

Also, when after-treating the cellulose dyeings obtained with the new dyestuffs with agents which improve the wet fastness and/or the fastness to creasing, the shade and fastness to light of the dyeings are not affected to any noticeable extent. This is particularly the case with those dyestuffs of Formula IV wherein the naphthyl radical A is a 1 - hydroxy - disulfonaphthyl - (2) radical, particularly the 1 - hydroxy - 3,6 - disulfonaphthyl - (2) radical.

Dyeings on cotton with optimal fastness properties and exhaustion rate are obtained with those dyestuffs according to the invention which fall under the formula

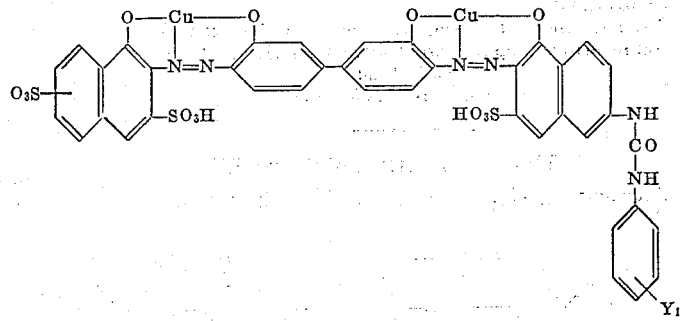

wherein $Y_1$ represents hydrogen, lower alkyl, chlorine or bromine.

The following non-limitative examples serve to illustrate the invention. Temperatures are given therein in degrees centigrade.

Example 1

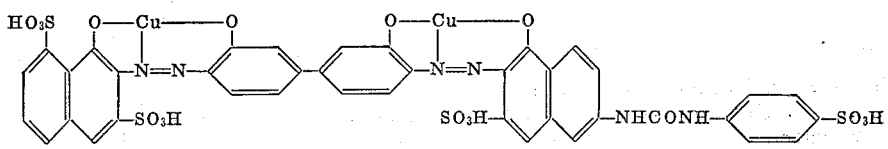

24.4 g. of 4,4'-diamino-3,3'-dimethoxydiphenyl are tetrazotised in the usual way and the tetrazo compound is poured into a 0–5° cold solution of 30.4 g. of 1-hydroxynaphthalene-3,8-disulphonic acid and 35 g. of sodium carbonate in 1000 ml. of water. After a short time the

| I No. | II component A | III component B | IV shade on cotton |
|---|---|---|---|
| 2 | 1-hydroxynaphthalene-3,6-disulphonic acid. | 2-(4'-sulphophenylureido)-5-hydroxynaphthalene-7-sulphonic acid. | Blue. |
| 3 | 2-hydroxynaphthalene-3,6-disulphonic acid. | ___do___ | Reddish blue. |
| 4 | 2-hydroxynaphthalene-6,8-disulphonic acid. | ___do___ | Do. |
| 5 | 1-hydroxynaphthalene-3,6-disulphonic acid. | 2-phenylureido-5-hydroxynaphthalene-7-sulphonic acid. | Blue. |
| 6 | 1-hydroxynaphthalene-3,8-disulphonic acid. | ___do___ | Do. |
| 7 | 1-hydroxynaphthalene-3,6,8-trisulphonic acid. | ___do___ | Do. |
| 8 | 2-hydroxynaphthalene-3,6-disulphonic acid. | ___do___ | Reddish Blue. |
| 9 | 2-hydroxynaphthalene-6,8-disulphonic acid. | 2-(3'-bromophenylureido)-5-hydroxynaphthalene-7-sulphonic acid. | Blue. |
| 10 | 1-hydroxynaphthalene-3,6-disulphonic acid. | 2-(3'-chlorophenylureido)-5-hydroxynaphthalene-7-sulphonic acid. | Do. |
| 11 | 2-hydroxynaphthalene-6,8-disulphonic acid. | ___do___ | Reddish Blue. |
| 12 | 2-hydroxynaphthalene-3,6-disulphonic acid. | 2-(4'-nitrophenylureido)-5-hydroxynaphthalene-7-sulphonic acid. | Do. |
| 13 | ___do___ | 2-(4'-acetylaminophenylureido)-5-hydroxynaphthalene-7-sulphonic acid. | Do. |
| 14 | 1-hydroxynaphthalene-3,6,8-trisulphonic acid. | ___do___ | Blue. |
| 15 | 1-hydroxynaphthalene-3,6,8-trisulphonic acid. | 2-(3'-nitrophenylureido)-5-hydroxynaphthalene-7-sulphonic acid. | Do. |
| 16 | 1-hydroxynaphthalene-3,6-disulphonic acid. | 2-(3'-sulphophenylureido)-5-hydroxynaphthalene-7-sulphonic acid. | Do. |
| 17 | 1-hydroxynaphthalene-3,8-disulphonic acid. | ___do___ | Do. |
| 18 | 1-hydroxynaphthalene-4-sulphonic acid. | 2-(3'-sulphophenylureido)-5-hydroxynaphthalene-7-sulphonic acid. | Reddish blue. |
| 19 | 2-hydroxynaphthalene-6-sulphonic acid. | ___do___ | Do. |
| 20 | 1-hydroxynaphthalene-3,6-disulphonic acid. | 2-(3'-methyl-phenylureido)-5-hydroxynaphthalene-7-sulphonic acid. | Do. |
| 21 | ___do___ | 2-(4'-methoxy-phenylureido)-5-hydroxynaphthalene-7-sulphonic acid. | Do. |
| 22 | ___do___ | 2-(4'-propionylamino-phenylureido)-5-hydroxynaphthalene-7-sulphonic acid. | Do. |
| 23 | ___do___ | 2-(4'-benzoylamino-phenylureido)-5-hydroxynaphthalene-7-sulphonic acid. | Do. | diazo-monoazo dyestuff has completely precipitated and no more tetrazonium compound can be traced. A sodium carbonate alkaline solution of 43.8 g. of 2-(4'-sulphophenylureido.)-5-hydroxynaphthalene-7-sulphonic acid is then added to this reaction mixture and the whole is stirred until the coupling is complete. The disazo dyestuff obtained in this way is precipitated with sodium chloride, filtered off and again dissolved in 2500 ml. of 80–85° hot water. 400 ml. of a copper oxide-ammonia solution which contains 50 g. of crystalline copper sulphate and 120 ml. of concentrated aqueous ammonia, are then added to this solution and the whole is stirred for 4 to 5 colour an which draws excellently from an aqueous bath onto cotton, linen and regenerated cellulose fibres. The dyeings, particularly in navy blue shades, have excellent light fastness and the shade and fastness to light are hardly influenced at all by anti-crease processing.

Example 25

Example 24 is repeated, but in lieu of 1-hydroxynaphthalene-3,6-disulfonic acid, there is used 30.4 g. of 2-hydroxynaphthalene-6,8-disulfonic acid, all other reactants and reaction conditions remaining the same.

There is obtained the dystuff of the formula

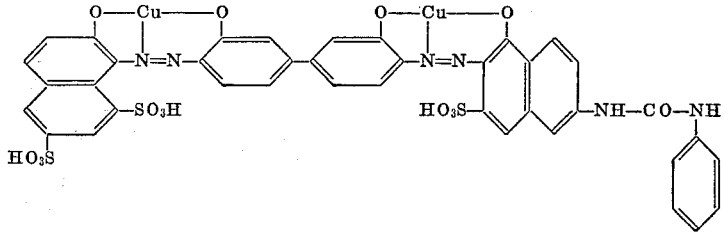

hours at 80–85°. After adding another 50 ml. of concentrated ammonia solution, the whole is heated for 10–20 hours at 90–95°. The copper complex formed is precipitated with sodium chloride, filtered off and dried. It is a dark powder which dissolves in water with a blue colour and which draws excellently onto cotton, linen and regenerated cellulose fibres from an aqueous bath. The dyeings, particularly in navy blue shades, are excellently light fast and the shade and fastness to light are hardly influenced at all by anti-crease processing.

If, instead of the hydroxynaphthalene sulphonic acids given in the example, the components A and B given in columns II and III are used and otherwise the procedure given in the example is followed, then valuable dyestuffs are also obtained which have the shades given in column IV.

which affords dyeings, especially on cotton, which are of navy blue shades with a slightly more reddish tinge than those obtained in the preceding example, of similar good fastness properties.

The wash fastness of these dyestuffs is ensured by an after-treatment with a cationic dyestuff fixing agent.

Example 26

In a dyebath, 6 g. of the dyestuff obtained according to Example 24 are dissolved in 3000 ml. of water containing 1 g. of sodium carbonate. 100 g. of cotton are introduced into the liquor at 40–50°, the bath is heated within 30 minutes to 90–95°, two portions each of 40 g. of sodium sulfate are then added successively and the goods are dyed for 60 minutes at the last-mentioned temperature. The dyed goods are rinsed cold and then Example 24

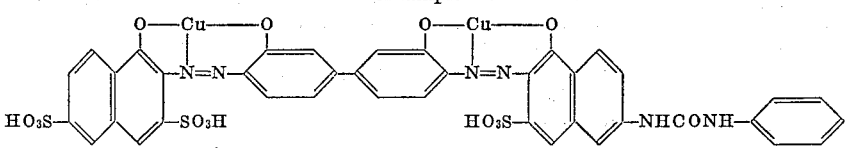

24.4 g. of 4,4'-diamino-3,3'-dimethoxydiphenyl are tetrazotised in the usual way and the tetrazo solution is poured into a 0–5° cold solution of 30.4 g. of 1-hydroxynaphthalene-3,6-disulphonic acid and 35 g. of sodium carbonate in 1000 ml. of water. After a short time, the diazo-monoazo dyestuff has completely precipitated and no more tetrazonium compound can be traced. A sodium carbonate alkaline solution of 35.8 g. of 2-phenylureido-5-hydroxynaphthalene-7-sulphonic acid in 200 ml. of water is now added to the reaction mixture and the whole is stirred until the coupling is complete. The disazo dyestuff obtained in this way is precipitated with sodium chloride, filtered off and dissolved again in 2500 ml. of 80–85° hot water. 400 ml. of a copper oxide-ammonia solution which contains 50 g. of crystalline copper sulphate and 120 ml. of concentrated aqueous ammonia are then added to the above solution and the whole is stirred for 4–5 hours at 80–85°. After adding another 50 ml. of concentrated ammonia solution, the whole is heated for 15 hours at 90–95°. The copper complex formed is precipitated with sodium chloride, filtered off and dried. It is a dark powder which dissolves in water with a blue introduced into 3000 ml. of an aqueous bath containing 1 g. of the quaternized product of pentamethyldiethylene-triamine and 2,2'-diclorodiethylether, produced as described in Example 1 of British Patent 702,695, added to the bath in the form of a 35%-aqueous solution, as cationic fixing agent, acidified with 0.5 ml. of 40%-acetic acid; the goods are left for 20 minutes in the bath which has a temperature of 30°, and then removed and dried without intermediate rinsing.

A strong navy blue dyeing is obtained which has good wet fastness properties and excellent fastness to light.

When subjecting the dyeings obtained in Example 26 to Wash Test 3, prescribed in "Standard Methods for the Determination of the Colour Fastness of Textiles" published by the Society of Dyers and Colourists, Bradford, Yorkshire, p. 106/107 (1962), they are free from bleeding on wool, while the dyeings prepared in an identical manner with the above-mentioned known dyestuffs which are distinguished structurally only by a semi-urea bridge instead of the —NH—CO—NH-bridge of the dyestuffs according to the instant invention, show pronounced bleeding.

We claim:
1. A copper-complex disazo dyestuff which in its free acid form is of the formula

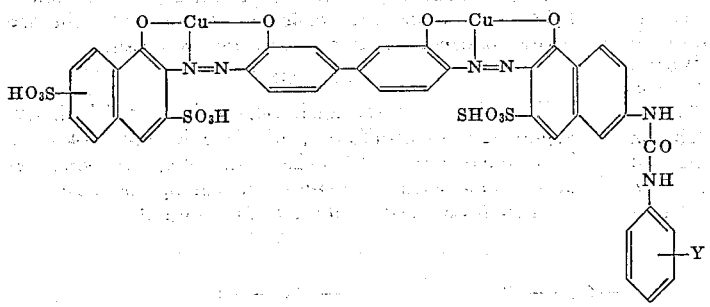

wherein Y represents hydrogen, lower alkyl, lower alkoxy, lower alkanoylamino, benzoylamino, nitro, sulfo, chlorine or bromine.

wherein $Y_1$ represents hydrogen, lower alkyl, chlorine or bromine.

3. A copper-complex disazo dyestuff which in its free acid form is of the formula

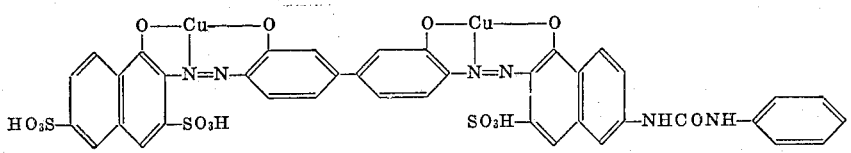

4. A copper-complex disazo dyestuff which in its free acid form is of the formula

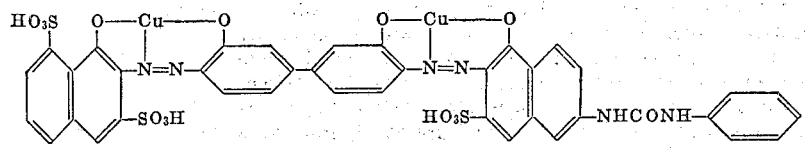

2. A copper-complex disazo dyestuff which in its free acid form is of the formula

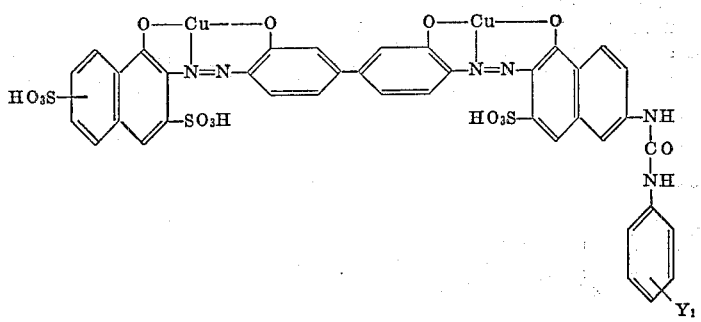

5. A copper-complex disazo dyestuff which in its free acid form is of the formula

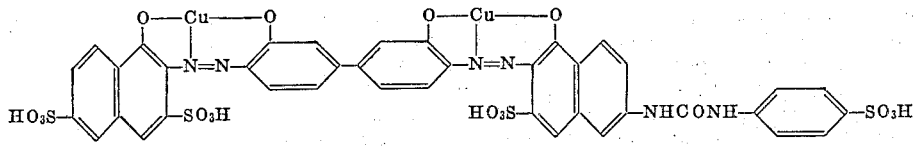

6. A copper-complex disazo dyestuff which in its free acid form is of the formula

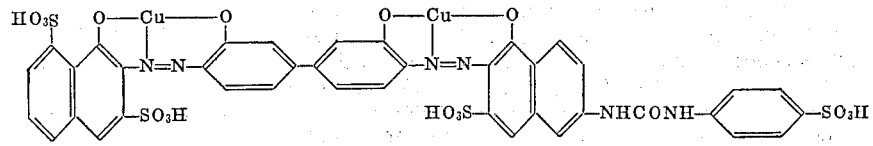

References Cited

UNITED STATES PATENTS 2,753,335   7/1956   Wehrli _____ 260—148

FLOYD D. HIGEL, *Primary Examiner.*